(12) United States Patent
Kuboki

(10) Patent No.: US 10,436,308 B2
(45) Date of Patent: Oct. 8, 2019

(54) POWER TRANSMISSION SYSTEM

(71) Applicant: HONDA MOTOR CO., LTD., Tokyo (JP)

(72) Inventor: Keita Kuboki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 33 days.

(21) Appl. No.: 15/918,473

(22) Filed: Mar. 12, 2018

(65) Prior Publication Data
US 2018/0259057 A1  Sep. 13, 2018

(30) Foreign Application Priority Data

Mar. 13, 2017 (JP) .................. 2017-047778
May 16, 2017 (JP) .................. 2017-097695

(51) Int. Cl.
*F16H 57/04* (2010.01)
*F16H 37/08* (2006.01)
*B60K 17/344* (2006.01)

(52) U.S. Cl.
CPC ......... *F16H 57/043* (2013.01); *B60K 17/344* (2013.01); *F16H 37/0813* (2013.01); *F16H 57/0423* (2013.01); *F16H 57/0427* (2013.01); *F16H 57/0457* (2013.01); *F16H 57/0471* (2013.01); *F16H 57/0495* (2013.01); *F16H 57/0483* (2013.01)

(58) Field of Classification Search
None
See application file for complete search history.

(56) References Cited

U.S. PATENT DOCUMENTS

| 4,227,427 A * | 10/1980 | Dick ...................... F16C 19/548 184/6.12 |
| 5,480,003 A * | 1/1996 | Hill ........................ F16C 17/045 184/6.12 |
| 2001/0004620 A1* | 6/2001 | Onuki ..................... F16H 61/16 477/115 |
| 2005/0199213 A1* | 9/2005 | Hamada .............. F16H 57/0421 123/196 R |

FOREIGN PATENT DOCUMENTS

JP  2015-168392 A  9/2015

* cited by examiner

*Primary Examiner* — Colby M Hansen
(74) *Attorney, Agent, or Firm* — Westerman, Hattori, Daniels & Adrian, LLP

(57) ABSTRACT

A transfer input shaft 51 of a transfer device 5 of a power transmission system PT has a first connection hole 51*a* that extends in a rotational axis direction from an end face on the side of a transfer input gear 55 that meshes with a final driven gear 42, and that connects the inside of a transmission case 61 and the inside of a transfer case 53. The transmission case 61 has a rib 62 that receives lubricating fluid scraped up by a final driven gear 42, and guides it toward the first connection hole 51*a*, in a position facing the end face of the transfer input shaft 51.

8 Claims, 8 Drawing Sheets

POWER TRANSMISSION SYSTEM

CROSS-REFERENCE OF RELATED APPLICATION

This application claims priority of Japanese Patent Application No. 2017-047778 filed in Japan on Mar. 13, 2017 and Japanese Patent Application No. 2017-097695 filed in Japan on May 16, 2017, the entire contents of which are incorporated herein by reference.

TECHNICAL FIELD

The present invention relates to a power transmission system.

BACKGROUND OF THE INVENTION

Conventionally, as a power transmission device installed in a vehicle or the like, a power transmission system including a transmission which outputs a driving force from an internal combustion engine while performing speed-changing, a differential device which allocates the driving force outputted from the transmission to left and right drive wheels, and a transfer device arranged adjacent to the differential device and allocating the driving force to front and rear drive wheels has been known (see Japanese Patent Application Publication No. 2015-168392, for example).

In a power transmission system of Japanese Patent Application Publication No. 2015-168392, a differential device includes a final driven gear that is rotatably supported by a case of the power transmission device and meshes with a final drive gear.

A known transfer device includes a transfer input gear to which a driving force of the final driven gear of the differential device is transmitted, a transfer input shaft that is rotatably supported by the case of the power transmission device and that supports the transfer input gear, a first bevel gear supported by the transfer input shaft, a second bevel gear that meshes with the first bevel gear, and a transfer output shaft that supports the second bevel gear.

In a transfer device of a conventional power transmission system such as that described in Japanese Patent Application Publication No. 2015-168392, a lubricating fluid such as lubricating oil needs to be supplied to meshing parts of gears located inside of the power transfer system, bearing for pivotally supporting a shaft in a rotatable manner, and other parts.

Conceivable methods of supplying a lubricating fluid to the inside of the transfer device include installation of a lubrication mechanism of lubricating fluid in the transfer device, for example. It is also conceivable to feed lubricating oil scraped or scooped up by a final driven gear from an oil reservoir inside a first case of the differential device, through a channel formed in the first case and a second case, from the differential device to the transfer device.

However, these methods require a space for arranging the lubrication mechanism for the transfer device, or thickness for forming a channel in the first case and the second case. Hence, this may enlarge the system as a whole.

There is a need of providing a power transmission system that can supply a sufficient amount of lubricating fluid to a transfer device, while suppressing enlargement of the system.

SUMMARY OF THE INVENTION

To achieve the above objective, a power transmission system of one embodiment according to the present invention is a power transmission system (e.g., power transmission system PT of the embodiment. The same applies hereinafter) including: a differential device (e.g., front differential gear 4 of the embodiment. The same applies hereinafter); a transfer device (e.g., transfer device 5 of the embodiment. The same applies hereinafter) arranged adjacent to the differential device); and a case housing therein the differential device and the transfer device and forming therein a fluid reservoir of lubricating fluid (e.g., a transmission case 61 and a transfer case 53 of the embodiment. The same applies hereinafter), in which: the differential device includes a rotation member (e.g., transfer drive gear 42b of the embodiment. The same applies hereinafter) rotatably supported by said case and configured to rotate by a driving force from a final drive gear (e.g., final driven gear 30 of the embodiment. The same applies hereinafter) while the lubricating fluid is scooped up from the fluid reservoir with the rotating rotation member; the transfer device includes a transfer input gear (e.g., transfer input gear 55 of the embodiment. The same applies hereinafter) to which a driving force from the rotation member is transmitted and a transfer input shaft (e.g., transfer input shaft 51 of the embodiment. The same applies hereinafter) rotatably supported by the case and supports the transfer input gear at one end of the transfer input shaft such that said rotation member rotates together with said transfer input shaft; the transfer input shaft has a connection hole (e.g., first connection hole 51a and second connection hole 51b of the embodiment. The same applies hereinafter) that extends in a rotational axis direction of the transfer input shaft from an end face of the transfer input shaft on the transfer input gear side, and that connects the inside of the transfer input shaft and the outside of the transfer input shaft; and the case has a rib (e.g., rib 62, rib members 63, 64 of the embodiment. The same applies hereinafter) that receives lubricating fluid scooped up by the rotation member from the fluid reservoir, and guides the received lubricating fluid toward the connection hole, in a position facing the end face of the transfer input shaft on the transfer input gear side.

Thus, in the power transmission system of another embodiment according to the present invention, first, lubricating fluid (e.g., a lubricating oil) scraped up by the rotation member rotating by the driving force from the final drive gear (e.g., the transfer drive gear, the final driven gear, etc.) is received by the rib, and is guided, through the end face of the transfer input shaft, or directly to the connection hole. Thereafter, the lubricating fluid is guided to the outside of the transfer input shaft (i.e., an engaged/meshed part of the gears the inside of the transfer device and the space where bearings for rotatably supporting the transfer input shaft are located), through the connection hole.

At this time, since the lubricating fluid is guided by the end face instead of the circumferential face of the transfer input shaft, the fluid is less likely to be splashed off even when the transfer input shaft rotates at high speed, for example. Accordingly, in the power transmission system, sufficient and not less than a certain amount of lubricating fluid is constantly supplied into the space outside of the transfer input shaft through the connection hole, regardless of the rotation speed or the like of the transfer input shaft.

Accordingly, in the power transmission system of another embodiment according to the present invention, there is no need to provide a lubrication mechanism for the transfer device, and there is no need to form a channel for lubricating fluid in the case of the power transmission system. Hence, enlargement of the system can be avoided. Additionally, a sufficient amount of lubricating fluid can be supplied to the transfer device.

Note that the rotation member can be any type of members rotatably supported by the case, such that the rotation member can transmit the driving force directly to the transfer input gear from the final drive gear, or indirectly through other gears that receive the driving force of the final drive gear.

In the power transmission system of another embodiment according to the present invention, the fluid reservoir is formed in the case, and the case may include a first case rotatably supporting the rotation member (e.g., a transmission case 61 of the embodiment. The same applies hereinafter) and a second case rotatably supporting the transfer input shaft (e.g., a transfer case 53 of the embodiment. The same applies hereinafter), and the connection hole is formed in a manner that connects the inside of the first case and the inside of the second case.

In the power transmission system of another embodiment according to the present invention, it is preferable that the transfer input shaft have a radial groove part (e.g., radial groove portion 51*c* of the embodiment. The same applies hereinafter) extending radially outward from an edge of the connection hole, in the end face on the transfer input gear side, and an edge part of the radial groove part on the rear side in the rotation direction of the transfer input shaft curve so as to protrude further to the front side in the rotation direction of the transfer input shaft, toward the radially outer side.

By providing such a radial groove part, the lubricating fluid guided by the end face of the transfer input shaft is guided to the connection hole along the edge of the radial groove part on the rear side of the rotation direction of the transfer input shaft, along with rotation of the transfer input shaft. Hence, a sufficient amount of lubricating fluid can be stably supplied to the transfer device.

In the power transmission system of another embodiment according to the present invention, it is preferable that the transfer input shaft have an annular groove part (e.g., annular groove portion 51*d* of the embodiment. The same applies hereinafter) on an outer peripheral part of the end face on the transfer input gear side.

By providing such an annular groove part, of the lubricating fluid guided to the end face of the transfer input shaft on the transfer input gear side, the lubricating fluid that did not reach the connection hole temporarily pools in the annular groove part. The lubricating fluid retained in this manner is guided to the connection hole when the rotation speed of the transfer input shaft lowers, for example. Thus, the lubricating fluid can be supplied efficiently to the transfer device.

In the power transmission system of another embodiment according to the present invention, it is preferable that the transfer input gear be supported to an end part of the transfer input shaft, such that an end face of the transfer input gear and an end face of the transfer input shaft coincide with each other.

By thus making the end face of the transfer input gear coincide with the end face of the transfer input shaft, the lubricating fluid guided by the rib can be received by a wider area. Hence, lubricating fluid can be supplied to the transfer device even more efficiently.

In the power transmission system of another embodiment according to the present invention, it is preferable that an end face of the transfer input shaft on the transfer input gear side be inclined so as bow inward toward the center.

By thus inclining the end face of the transfer input shaft, the lubricating fluid guided by the end face is guided to the connection hole more easily. Hence, a sufficient amount of lubricating fluid can be stably supplied to the transfer device.

In the power transmission system of another embodiment according to the present invention, it is preferable that the rib include a first rib part (e.g., first rib portion 62*b*, 63*b*, 64*b* of the embodiment. The same applies hereinafter) and a second rib part (e.g., second rib portion 62*b*, 63*b*, 64*b* of the embodiment. The same applies hereinafter) provided lower than the first rib, and a tip end part of the first rib part protrude further to the rotation member side than a tip end part of the second rib part.

By forming the rib in such a stepped manner, the first rib part receives lubricating fluid when the rotation speed of the rotation member is high (i.e., when the lubricating fluid is scraped up higher), and the second rib part receives the lubricating fluid when the rotation speed is low (i.e., when the lubricating fluid is not scraped up so high).

Accordingly, the lubricating fluid can be guided to the transfer input shaft regardless of the rotation speed of the rotation member. Hence, a sufficient amount of lubricating fluid can be stably supplied to the transfer device.

In the power transmission system of another embodiment according to the present invention, it is preferable that the first case have a flow-guiding groove part (e.g., flow-guiding groove portion 61*a* of the embodiment. The same applies hereinafter) that extends along a circumferential face of the rotation member below the rib, and the rib be positioned on a straight line extended from the flow-guiding groove part.

By providing such a flow-guiding groove part, of the lubricating fluid scooped up by the rotation member, the lubricating fluid scraped up toward the wall face of the first case flows along the flow-guiding groove part, and therefore is splashed up toward the rib. Hence, the lubricating fluid other than that received directly by the rib is also guided to the connection hole, whereby an even more sufficient amount of lubricating fluid can be supplied to the transfer device.

DETAILED DESCRIPTION OF EMBODIMENTS OF THE INVENTION

First Embodiment

Hereinafter, a power transmission system of a first embodiment will be described with reference to FIGS. 1 to 6.

Figure 1:
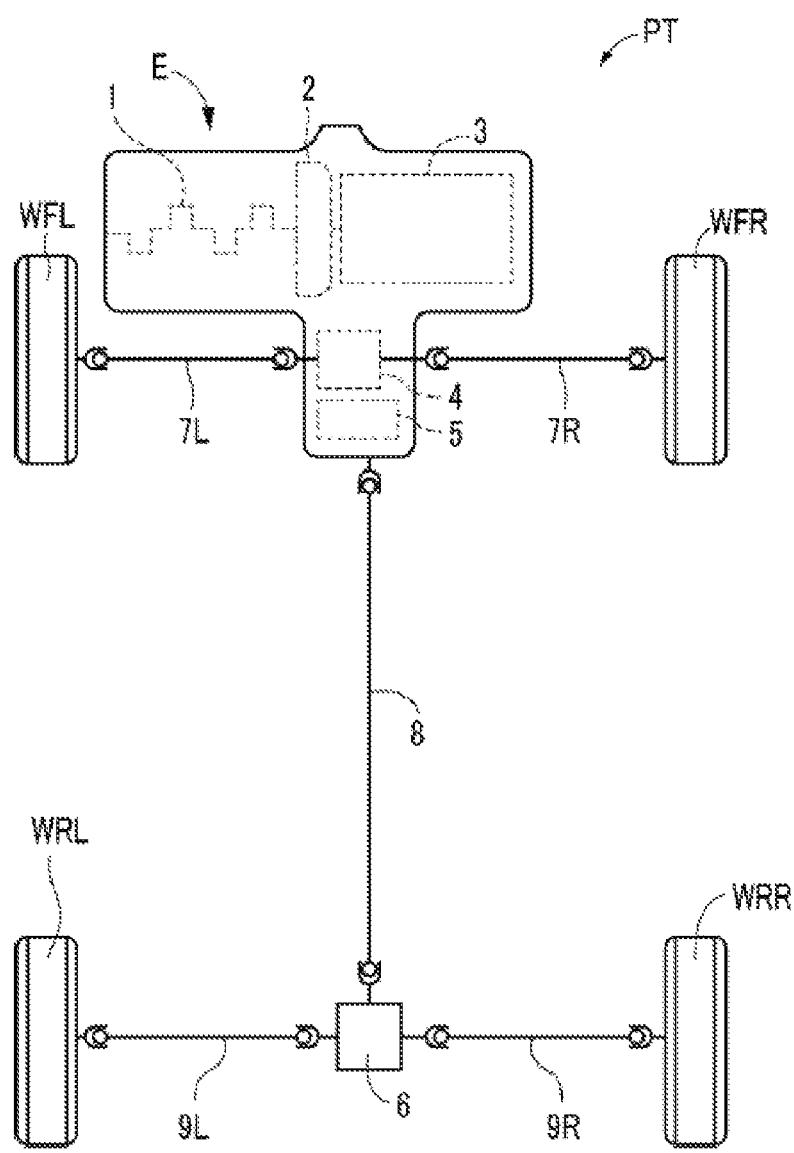
FIG. 1 is a schematic diagram of a power transmission system of a first embodiment.

As illustrated in FIG. 1, an engine E (a power source such as an internal combustion engine) is transversely mounted on a vehicle body, such that a crankshaft 1 extends in the vehicle width direction.

A power transmission system PT that transmits driving force of the engine E to a front left wheel WFL, a front right wheel WFR, a rear left wheel WRL, and a rear right wheel WRR is configured of: a torque converter 2 connected to the crank shaft 1; a transmission 3 connected to the torque converter 2; a front differential gear 4 (differential device) connected to the transmission 3; a transfer device 5 connected to the front differential gear 4; and a rear differential gear 6 connected to the transfer device.

The front differential gear 4 is connected to the front left wheel WFL and the front right wheel WFR, through a front left axle 7L and a front right axle 7R. The rear differential gear 6 is connected to the transfer device 5 through a propeller shaft 8, and is connected to the rear left wheel WRL and the rear right wheel WRR, through a rear left axle 9L and a rear right axle 9R.

Next, the transmission 3 will be described with reference to FIG. 2.

Figure 2:
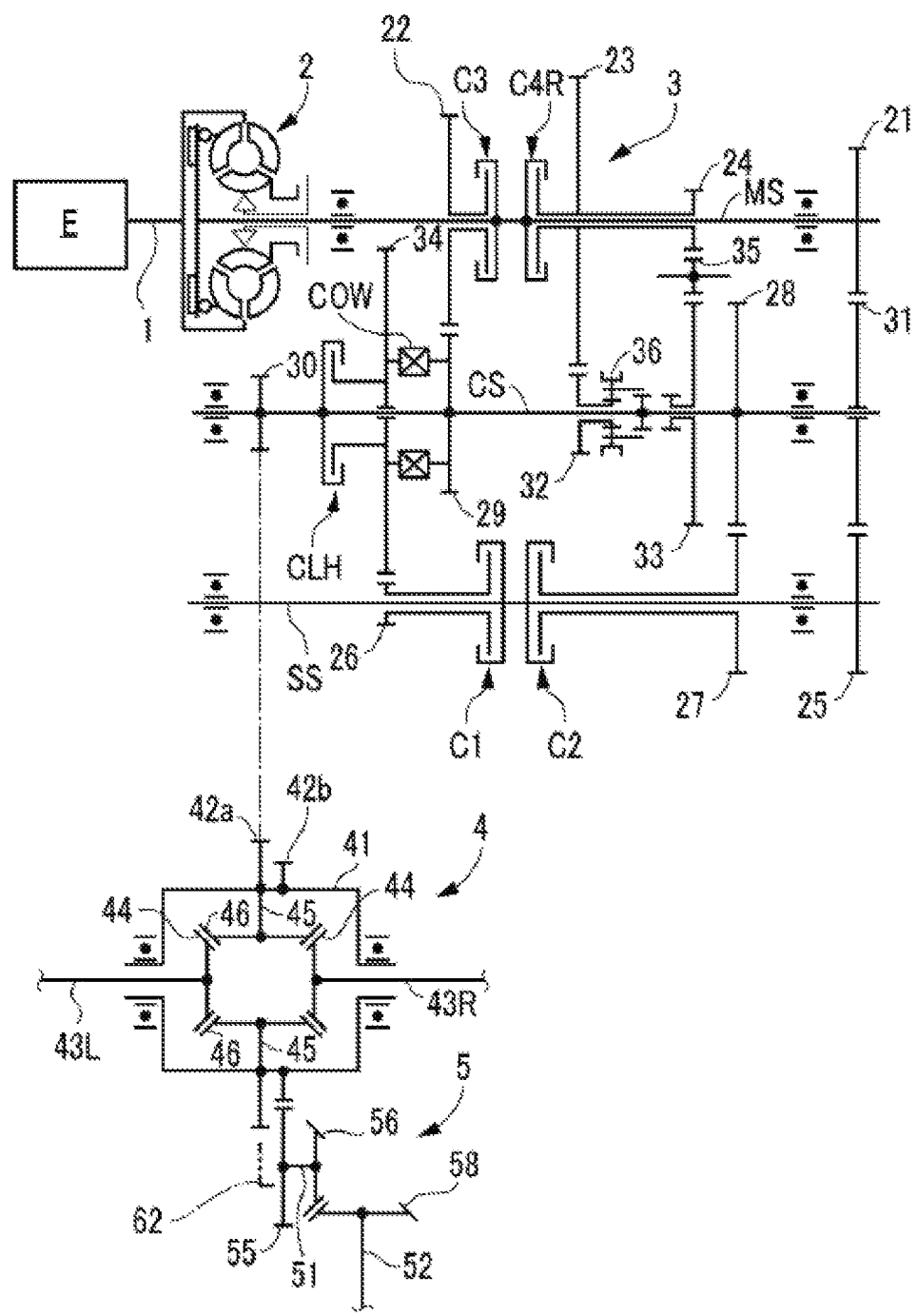
FIG. 2 is a skeleton diagram of the power transmission system of FIG. 1.

As illustrated in FIG. 2, the transmission 3 is arranged parallel to one another, and includes a main shaft MS, a secondary shaft SS, and a counter shaft CS extending in the vehicle width direction.

A main drive gear 21 is fixed to the main shaft MS. Also, a main third gear 22 that is engageable with the main shaft MS by a third clutch C3, and a main fourth gear 23 and a main reverse gear 24 integrally formed and engageable with the main shaft MS by a fourth-reverse clutch C4R are freely rotatably supported to the main shaft MS.

A secondary driven gear 25 is fixed to the secondary shaft SS. Also, a secondary first gear 26 that is engageable with the second shaft SS by a first clutch C1, and a secondary second gear 27 that is engageable with the secondary shaft SS by a second clutch C2 are freely rotatably supported to the secondary shaft SS.

A counter second gear 28, a counter third gear 29, and a final drive gear 30 are fixed to the counter shaft CS. Also, a counter idle gear 31, a counter fourth gear 32, and a counter reverse gear 33 are freely rotatably supported to the counter shaft CS. Moreover, a counter first gear 34 that is engageable with the counter shaft CS through a first hold clutch CLH is freely rotatably supported to the counter shaft CS.

A reverse idle gear 35 meshes with the main reverse gear 24 and the counter reverse gear 33. The counter first gear 34 is engageable with the counter third gear 29 through a one way clutch COW. The counter fourth gear 32 and the counter reverse gear 33 are selectively engageable with the counter shaft CS through a selector 36.

The main drive gear 21 meshes with the counter idle gear 31. The counter idle gear 31 meshes with the secondary driven gear 25. Rotation of the crank shaft 1 of the engine E is transmitted to the secondary shaft SS, through the torque converter 2, the main shaft MS, the main drive gear 21, the counter idle gear 31, and the secondary driven gear 25.

In the transmission 3 configured in this manner, first speed is established by engaging the secondary first gear 26 freely rotatably supported to the secondary shaft SS, with the secondary shaft SS by the first clutch C1.

At first speed, rotation of the secondary shaft SS is transmitted to the counter shaft CS, through the first clutch C1, the secondary first gear 26, the one way clutch COW, and the counter third gear 29.

Note that although the first clutch C1 is engaged when establishing second to fourth speeds, the one way clutch COW slips.

In the transmission 3, second speed is established by engaging the secondary second gear 27 freely rotatably supported to the secondary shaft SS, with the secondary shaft SS by the second clutch C2.

At second speed, rotation of the secondary shaft SS is transmitted to the counter shaft CS, through the second clutch C2, the secondary second gear 27, and the counter second gear 28.

In the transmission 3, third speed is established by engaging the main third gear 22 freely rotatably supported to the main shaft MS, with the main shaft MS by the third clutch C3.

At third speed, rotation of the main shaft MS is transmitted to the counter shaft CS, through the third clutch C3, the main third gear 22, and the counter third gear 29.

In the transmission 3, fourth speed is established by engaging the main fourth gear 23 freely rotatably supported to the main shaft MS, with the main shaft MS by the fourth-reverse clutch C4R, while engaging the counter fourth gear 32 relatively rotatably supported to the counter shaft CS, with the counter shaft CS by the selector 36.

At fourth speed, rotation of the main shaft MS is transmitted to the counter shaft CS, through the fourth-reverse clutch C4R, the main fourth gear 23, the counter fourth gear 32, and the selector 36.

In the transmission 3, reverse gear is established by engaging the main reverse gear 24 relatively rotatably supported to the main shaft MS, with the main shaft MS by the fourth-reverse clutch C4R, while engaging the counter reverse gear 33 freely rotatably supported to the counter shaft CS, with the counter shaft CS by the selector 36.

At reverse gear, rotation of the main shaft MS is transmitted to the counter shaft CS, through the fourth-reverse clutch C4R, the main reverse gear 24, the reverse idle gear 35, the counter reverse gear 33, and the selector 36.

Moreover, in the transmission 3, first speed-hold is established by engaging the first hold clutch CLH while the first clutch C1 is in an engaged state.

At first speed-hold, the torque of the rear left wheel WRL and the rear right wheel WRR can be transmitted reversely to the engine E through the first hold clutch CLH even if the one way clutch COW slips. Hence, a strong engine brake can be used.

Next, a structure of the front differential gear 4 will be described.

As illustrated in FIG. 2, the front differential gear 4 includes a differential case 41 freely rotatably supported to a transmission case 61 (first case) (see FIGS. 3 and 4) of the transmission 3. A final driven gear 42a that meshes with the final drive gear 30 provided in the counter shaft CS and a transfer drive gear 42b (both or either of the gears may serve as a rotation member) that meshes with a transfer input gear 55 (described later) to transfer the driving force thereto is fixed on the outer periphery of the differential case 41. In the front differential gear 4, the final driven gear 42a and the transfer drive gear 42b have a different number of tooth from each other, via which the driving force is transmitted to the transfer input gear 55 (i.e., a rear left wheel WRL and rear right WRR) such that the driving force transmitted to the transfer 5 (the transfer input shaft 51) is determined by a gear ratio which is defined with the number of tooth of the transfer drive gear 42b and the number of tooth of the transfer input gear 55. However, it may be possible that the transfer input gear 55 is meshed with the final driven gear 42a, omitting the transfer drive gear 42b.

Rotation of the counter shaft CS of the transmission 3 is transmitted to the differential case 41, through the final drive gear 30 and the final driven gear 42a. Rotation of the differential case 41 is transmitted to the front left axle 7L and the front right axle 7R, depending on the load on the front left wheel WFL and the front right wheel WFR. The rotation force of the differential case 41 is transmitted to the transfer input gear 55 (i.e., the rear left wheel WRL and the rear right wheel WRR) via the transfer drive gear 42b.

A front left output shaft 43L connected to the front left axle 7L and a front right output shaft 43R connected to the front right axle 7R are relatively rotatably fitted into the differential case 41. A differential side gear 44 is spline-fitted to each of the opposite ends of the front left output shaft 43L and the front right output shaft 43R.

In the differential case 41, a pinion shaft 45 is fixed such that it is perpendicular to the front left output shaft 43L and the front right output shaft 43R. A pair of pinion gears 46 respectively meshing with the two differential side gears 44 are freely rotatably supported to the pinion shaft 45.

Next, a structure of the transfer device 5 will be described with reference to FIGS. 2 and 3.

Figure 3:
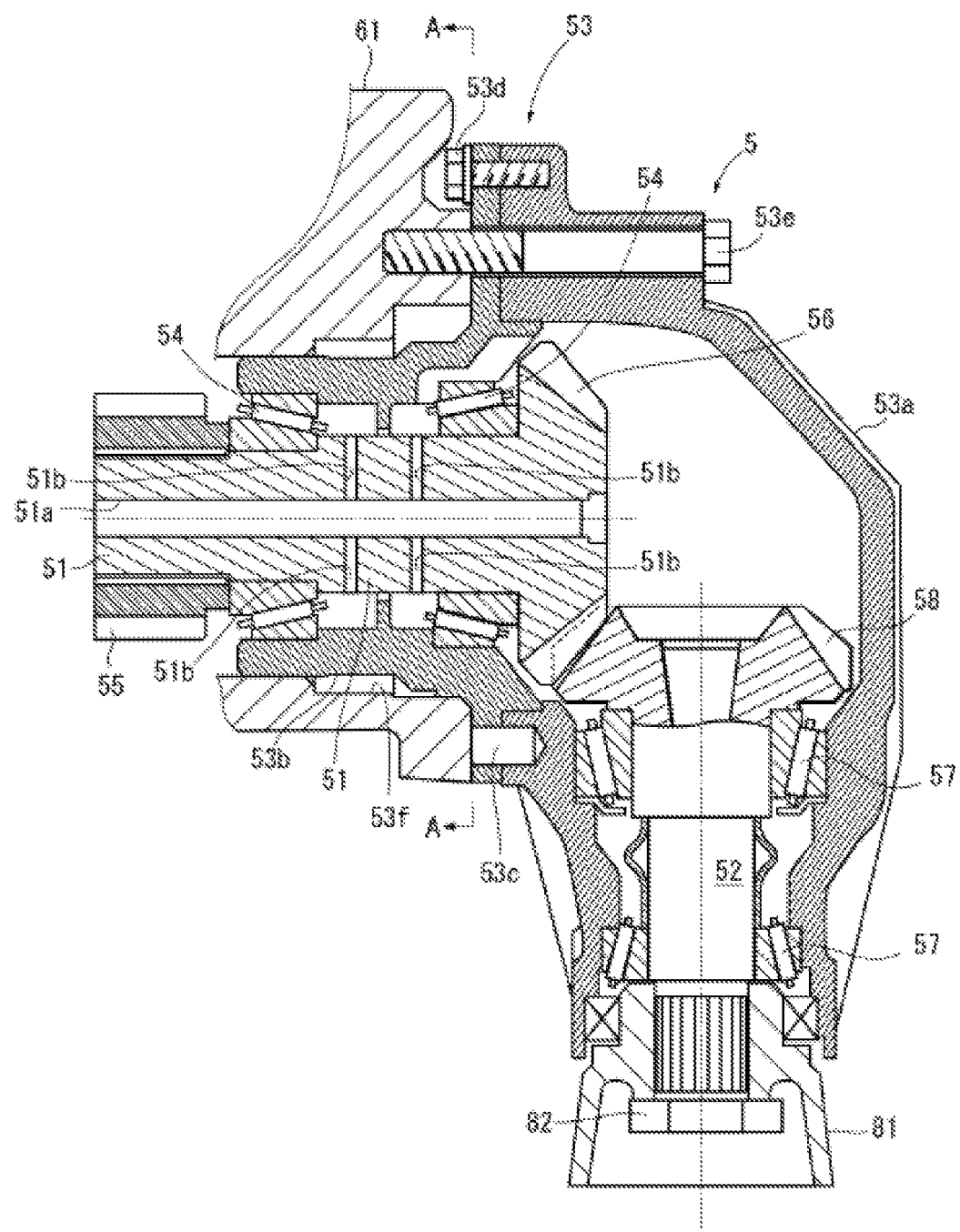
FIG. 3 is a cross-sectional view of a transfer device of the power transmission system of FIG. 1.

As illustrated in FIG. 3, the transfer device 5 includes: a transfer input shaft 51 to which a driving force of the transfer input gear 55 of the front differential gear 4 is transmitted; a transfer output shaft 52 to which the driving force is transmitted from the transfer input shaft 51 and that transmits the driving force to the propeller shaft 8; and a transfer case 53 (second case) that stores the transfer input shaft 51 and the transfer output shaft 52.

The transfer input shaft 51 extends in the vehicle width direction, and is freely rotatably supported to the transfer case 53 by a first tapered roller bearing 54.

A transfer input gear 55 that meshes with the transfer drive gear 42b is spline-fitted and supported to an end part of the transfer input shaft 51 on the front differential gear 4 side such that they rotate together. A first bevel gear 56 which is a helical gear is provided on the opposite end part of the transfer input shaft 51.

The transfer input gear 55 meshes with the transfer drive gear 42b (see FIG. 4) above the center of rotation of the transfer drive gear 42b. Hence, in the transfer device 5, a space is formed in a lower part thereof to improve freedom in layout of vehicle parts.

The transfer output shaft 52 extends in the longitudinal direction of the vehicle, and is freely rotatably supported to the transfer case 53 by a second tapered roller bearing 57.

A second bevel gear 58 which is a helical gear is provided on an end part (front end) of the transfer output shaft 52 on the transfer input shaft 51 side. Meanwhile, on the rear end of the transfer output shaft 52, a connector 81 to which the front end of the propeller shaft 8 is coupled is spline-fitted and fixed by a nut 82.

Since the first bevel gear 56 meshes with the second bevel gear 58, rotation of the transfer input shaft 51 is transmitted to the propeller shaft 8 (see FIG. 1) through the transfer output shaft 52.

The transfer case 53 is fixed to a right side face of the transmission case 61 (specifically, a torque converter case that constitutes a part of the transmission case 61).

The transfer case 53 is configured of a transfer case main body 53a, and a transfer cover 53b. The transfer case main body 53a and the transfer cover 53b are fastened as one unit by multiple first bolts 53d, while being located by a knock-pin 53c.

The transfer case 53 formed into a subassembly is fastened to the transmission case 61 by multiple second bolts 53e, which penetrate the transfer case main body 53a and the transfer cover 53b.

The transfer cover 53b is fitted into a support hole 53f in the transmission case 61. The transfer case 53 is fixed to the transmission case 61 by the second bolts 53e, with the transfer cover 53b fitted into the support hole 53f.

Thrust force of the transfer input shaft 51 in the transverse direction is received by a stepped part of the transfer cover 53b, through the transfer input gear 55 or the first bevel gear 56, and the first tapered roller bearing 54.

Figure 4:
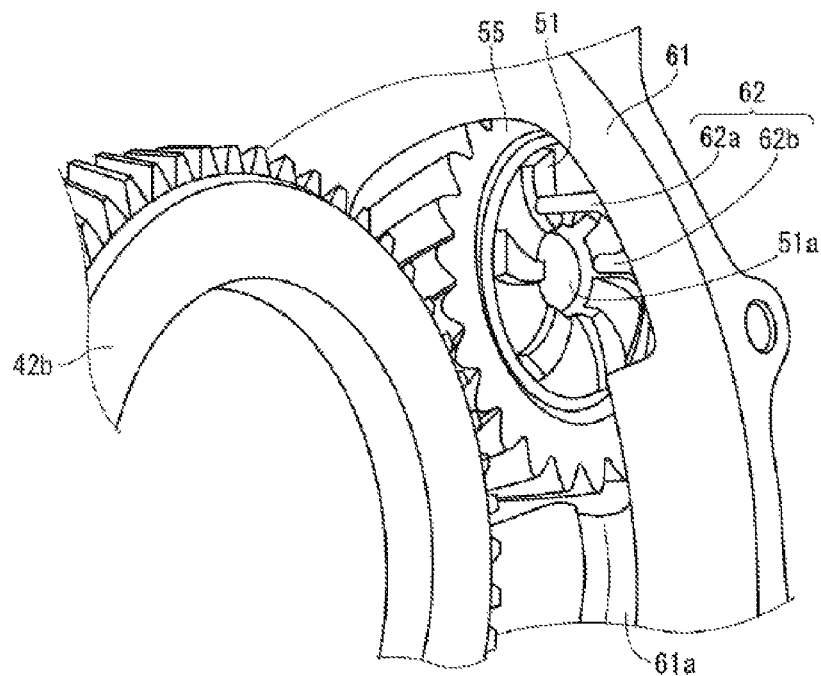
FIG. 4 is an enlarged perspective view of a main part of the power transmission system of FIG. 1.

Next, a structure for feeding lubricating oil (lubricating fluid) from the front differential gear 4 (differential device) to the transfer device 5 will be described, with reference to FIGS. 3 to 6. In FIG. 4, for easy reference and explanation, the differential case 41 and the final driven gear 42a are omitted and are not shown.

As illustrated in FIG. 3, the transfer input shaft 51 of the transfer device 5 has a first connection hole 51a extending in a rotational axial direction of the transfer input shaft 51, and second connection holes 51b extending radially from the first connection hole 51a.

The first connection hole 51a connects a space inside the transmission case 61 and a space inside the transfer case main body 53a of the transfer case 53. The second connection holes 51b connect a space inside the transmission case 61 and spaces inside the transfer cover 53b, through the first connection hole 51a.

As illustrated in FIG. 4, the transfer input gear 55 supported to the end part of the transfer input shaft 51 meshes with the transfer drive gear 42b, inside the transmission case 61. The position where the transfer input gear 55 meshes with the transfer drive gear 42b is higher than an oil reservoir (a fluid reservoir) of lubricating oil formed inside the transmission case 61.

The transmission case 61 has rib 62 extending in the rotational axis direction of the transfer input shaft 51, in a position facing the end face (end face illustrated in FIG. 4) of the transfer input shaft 51 on the transfer input gear 55 side. The rib 62 receive lubricating oil scooped and polled up from the oil reservoir by the transfer drive gear 42b, and guide the received lubricating oil to the first connection hole 51a formed in the end face of the transfer input shaft 51.

In the power transmission system PT configured in this manner, first, lubricating oil scooped up by the transfer drive gear 42b is received by the rib 62, and is guided, through the end face of the transfer input shaft 51, or directly to the first connection hole 51a. Thereafter, the lubricating oil is guided to the outside of the transfer input shaft 51 (i.e., the inside of the transfer device 5), through the first connection hole 51a and the second connection holes 51b.

At this time, since the lubricating oil is guided by the end face instead of the circumferential face of the transfer input shaft 51, the oil is less likely to be splashed off even when the transfer input shaft 51 rotates at high speed, for example. Accordingly, in the power transmission system PT, sufficient and not less than a certain amount of lubricating fluid is constantly supplied to the transfer device 5 through the first connection hole 51a and the second connection holes 51b, regardless of the rotation speed or the like of the transfer input shaft 51.

As shown in the embodiment of FIG. 2, the final driven gear 42a and the transfer drive gear 42b are located adjacent or in a close vicinity to each other. The final driven gear 42a has a diameter larger than that of the transfer drive gear 42b. That is, the final driven gear 42a is positioned closer to the rib 62 than the transfer drive gear 42b.

In the above configuration of the present embodiment, the rib 62 can receive not only the lubrication oil scooped by the transfer drive gear 42b, but also the part of the lubrication fluid scooped up by the final driven gear 42a, and the lubrication oil from both is introduced to the first connection hole 51a.

However, the present invention may not be limited to the above embodiment. For example, the rib 62 may receive the lubrication oil from only either of the transfer drive gear 42b or the final driven gear 42a. Thus, both or either of the transfer drive gear 42b and/or the final driven gear 42a can be used as the rotation member in the present invention.

Also, as illustrated in FIG. 4, the transmission case 61 has a flow-guiding groove portion 61a extending along the circumferential face of the transfer drive gear 42b, below the rib 62. The rib 62 is positioned on a straight line extended from the flow-guiding groove portion 61a.

Since the flow-guiding groove portion 61a is formed, inside the transmission case 61, of the lubricating oil scraped up by the transfer drive gear 42b, the lubricating oil scraped up toward the wall face of the transmission case 61 flows along the flow-guiding groove portion 61a, and therefore is splashed up toward the rib 62.

Hence, in the power transmission system PT, the lubricating oil other than that received directly by the rib 62 is also guided to the first connection hole 51a, through the flow-guiding groove portion 61a and the rib 62.

Figure 5:
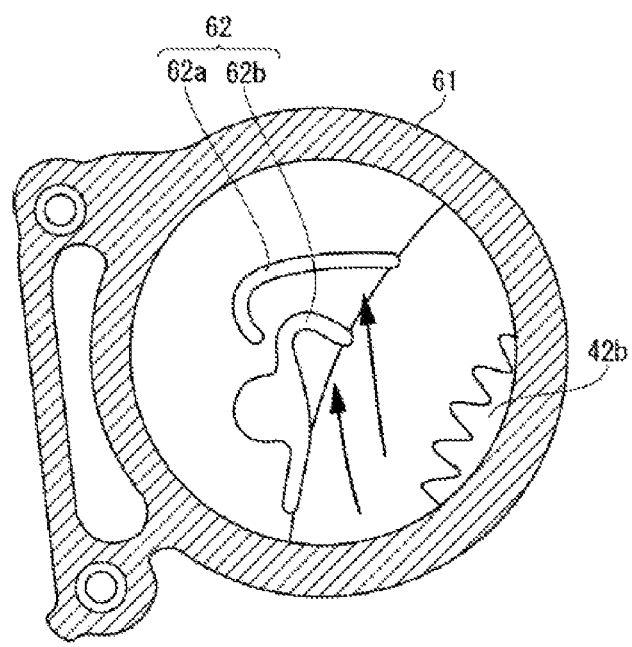
FIG. 5 is a cross-sectional view taken along line A-A of a transmission case of FIG. 3.

FIG. 5 is a diagram illustrating a part of the transmission case 61 that faces the end face of the transfer input shaft 51 on the transfer input gear 55 side (i.e., A-A cross section of FIG. 3).

As illustrated in FIG. 5, the rib 62 is configured of a first rib portion 62a, and a second rib portion 62b provided lower than the first rib portion 62a. A tip end part of the first rib portion 62a on the transfer drive gear 42b side protrudes further to the transfer drive gear 42b side than a tip end part of the second rib portion 62b on the transfer drive gear 42b side.

Hence, when the rotation speed of the transfer drive gear 42b is high (i.e., when lubricating oil is scraped up higher as indicated by the right arrow in FIG. 5), the first rib portion 62a receives the lubricating oil. On the other hand, when the rotation speed is low (i.e., when lubricating oil is not scraped up so high, as indicated by the left arrow in FIG. 5), the second rib portion 62b receives the lubricating oil.

Accordingly, in the power transmission system PT, the lubricating oil can be guided to the transfer input shaft 51, regardless of the rotation speed of the transfer drive gear 42b.

Note that the rib of the present invention is not limited to such shapes, and may be formed in any shape, as long as it is provided in a position facing the end face on the transfer input gear side of the transfer input shaft of the first case in which an oil reservoir is formed, receives lubricating fluid scooped up from the oil reservoir by the rotation member rotatably supported by the first case, and guides it toward a connection hole in the transfer input shaft.

For example, the rib may be formed of a single member, or may be formed by combining three or more rib portions. The direction in which the rib extends may be tilted with respect to the rotational axis direction of the transfer input shaft.

The rotation member may be any member which receives the driving force transmitted via the final drive gear. For example, the final driven gear 42a, in placed of the transfer drive gear 42b, can be used as the rotation member.

A configuration of the end part of the transfer input shaft 51 on the transfer input gear 55 side will be described in detail with reference to FIG. 6.

Figure 6:
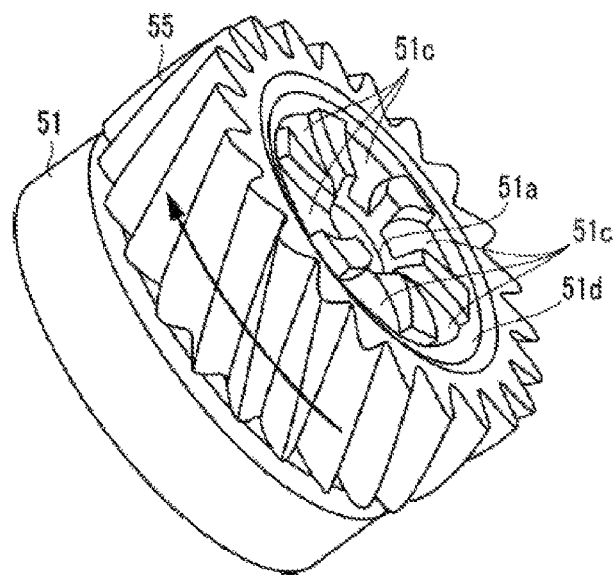
FIG. 6 is a perspective view of a structure of an end part of a transfer input shaft of the power transmission system of FIG. 1.

As illustrated in FIG. 6, multiple radial groove portions 51c extending radially outward from the edge of the first connection hole 51a are formed in the end face of the transfer input shaft 51 on the transfer input gear 55 side. The edge of the radial groove portion 51c on the rear side in the rotation direction (arrow direction in FIG. 6) of the transfer input shaft 51 is curved in such a manner as to protrude further to the front in the rotation direction of the transfer input shaft 51, toward the outer side in the radial direction.

The end face of the transfer input shaft 51 on the transfer input gear 55 side is inclined so as bow inward toward the center (i.e., the first connection hole 51a).

By thus providing the radial groove portions 51c in the end face and tilting the surface toward the center, the lubricating oil guided by the end face of the transfer input shaft 51 is guided to the first connection hole 51a against centrifugal force generated by rotation of the transfer input shaft 51.

Also, an annular groove portion 51d is formed in an outer peripheral part (specifically, a part outside the radial groove portions 51c) of the end face of the transfer input shaft 51 on the transfer input gear 55 side.

By providing such an annular groove portion 51d, of the lubricating oil guided to the end face of the transfer input shaft 51 on the transfer input gear 55 side, the lubricating oil that did not reach the first connection hole 51a due to centrifugal force or the like temporarily pools in the annular groove portion 51d. The lubricating oil retained in this manner is guided to the first connection hole 51a by the effect of the shape of the radial groove portions 51c, the inclination toward the center, or the like, when the rotation speed of the transfer input shaft 51 lowers, for example.

Note that the shape of the end face of the transfer input shaft of the present invention on the transfer input gear side may be any shape, as long as it can receive the lubricating fluid guided by the rib, and guide it to the connection hole. Hence, the end face may be a flat shape omitting the radial groove portions and the annual groove portion, or may include only one of the radial groove portions and the annular groove portion.

The transfer input gear 55 is supported to the transfer input shaft 51, such that the end face of the transfer input gear 55 coincides with the end face of the transfer input shaft 51 (specifically, the end face of protruding parts sandwiched by the radial groove portions 51c).

Thus, the area of the end face is increased to facilitate reception of lubricating oil guided by the rib 62. Also, since a deep groove portion is formed by the inner circumferential face of the end of the transfer input shaft 51 and the annular groove portion 51d, the lubricating oil that did not reach the first connection hole 51a due to centrifugal force or the like is more surely retained on the end face of the transfer input shaft 51.

Note that the transfer input gear of the present invention only needs to be supported to the end part of the transfer input shaft so that they rotate together, and the end face of the transfer input gear does not necessarily have to coincide with the end face of the transfer input shaft.

As has been described, in the power transmission system PT, there is no need to provide a lubrication mechanism for the transfer device 5, and there is no need to form a channel for lubricating oil in the transmission case 61 or the transfer case 53. Hence, enlargement of the system can be avoided. Additionally, a sufficient amount of lubricating oil can be stably supplied to the transfer device 5.

In the above embodiment, the first connection hole 51a and the second connection hole 51b are formed to communicate between the inside of the transmission case 61 and the inside of the transfer case 53 for stably supplying the lubricant oil to the transfer device 5. However, the configuration of the connection hole is not limited to such configuration, and any type connection communicating the inside and the outside of the transfer input shaft 51 with each other can be utilized.

For example, while the connection hole may be a hole communicating between the transmission case 61 where the oil reservoir exists and the space where the first tapered roller bearing 54 rotatably supporting the transfer input shaft 51 is located, as in the above embodiment, the connection hole may be a hole communicating between the inside of the transmission case 61 and the space where any gear attached to the transfer input shaft 51, other than the transfer input gear 55.

Although the above embodiment combines the transmission case 61 and the transfer case 53 to be the power transmission system PT, the present invention is not limited to such configuration. For example, the power transmission system may be integrally formed in a single case structure or composed of three or more cases.

Second Embodiment

Hereinafter, a power transmission system of a second embodiment will be described with reference to FIGS. 7 to 9. Note, however, that the power transmission system of the embodiment differs from the power transmission system of the first embodiment only in the configuration of a rib and the configuration of an end face of a transfer input shaft. Accordingly, parts configured in the same manner as the power transmission system of the first embodiment are assigned the same reference numerals, and detailed descriptions thereof will be omitted.

Figure 7:
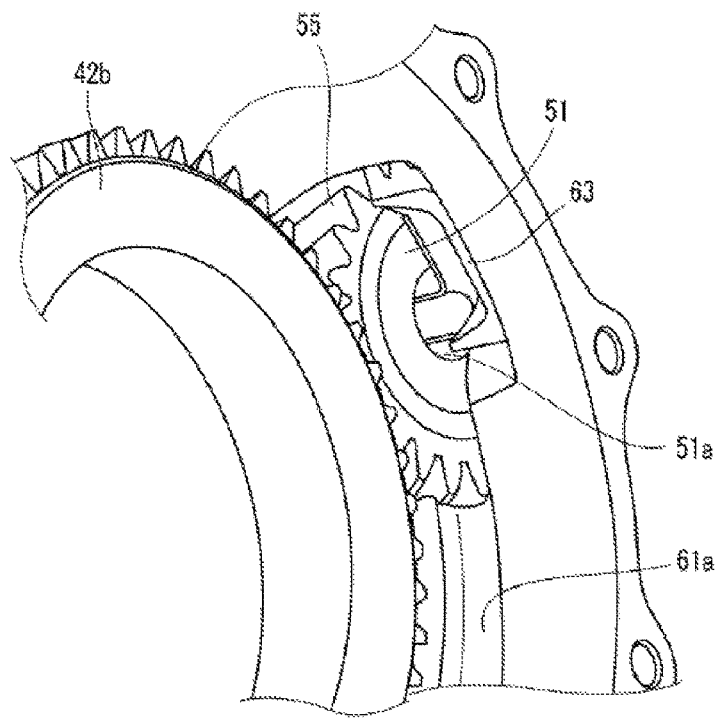
FIG. 7 is an enlarged perspective view of a main part of a power transmission system of a second embodiment.

As illustrated in FIG. 7, a rib of the embodiment is configured of a rib member 63 arranged inside a transmission case 61.

As illustrate in FIG. 8, the rib member 63 includes a first rib portion 63a extending in the rotational axis direction of a transfer input shaft 51, and a semicylindrical second rib portion 63b extending in the rotational axis direction of the transfer input shaft 51 below the first rib portion 63a.

The rib member 63 also has a first rib wall portion 63c connected to ends of the first rib portion 63a and the second rib portion 63b opposite to the transfer input shaft 51 side, and a second rib wall portion 63d connected to an end of the first rib portion 63a on the transfer input shaft 51 side so as to face the first rib wall portion 63c.

The second rib wall portion 63d has an opening on the transfer input shaft 51 side, whereas the second rib portion 63b extends to the transfer input shaft 51 side (specifically, toward the inside of a first connection hole 51a) from the edge of the opening (see FIG. 7).

A tip end part of the first rib portion 63a protrudes further to a transfer drive gear 42b side than a tip end part of the second rib portion 63b.

Figure 8:
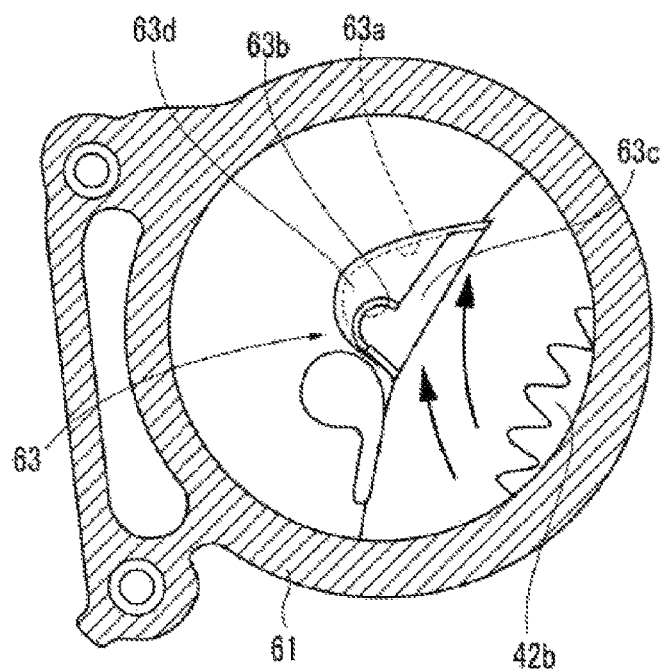
FIG. 8 is a plan view of an internal structure of a main part of a transmission case and a structure of a rib member of the power transmission system of FIG. 7.

Hence, when the rotation speed of the transfer drive gear 42b is high (i.e., when lubricating oil is scraped up higher as indicated by the right arrow in FIG. 8), the first rib portion 63a receives the lubricating oil. On the other hand, when the rotation speed is low (i.e., when lubricating oil is not scraped up so high, as indicated by the left arrow in FIG. 8), the second rib portion 63b receives the lubricating oil.

Figure 9:
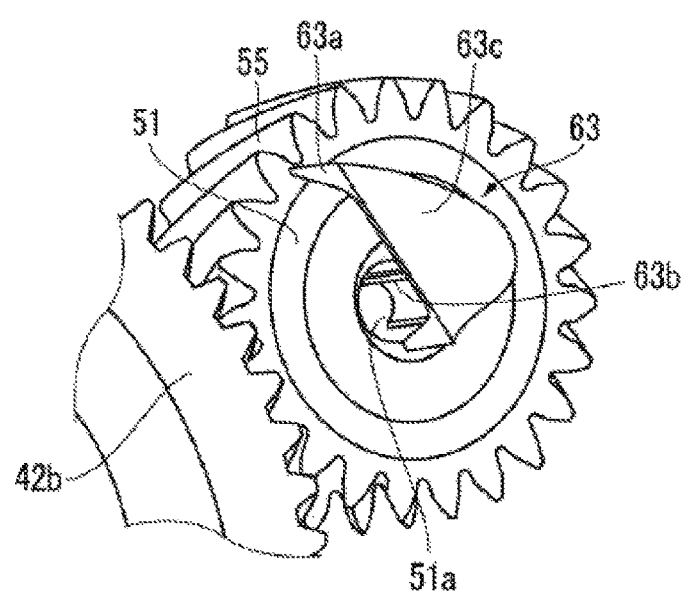
FIG. 9 is a perspective view of an end part of a transfer input shaft and the structure of the rib member of the power transmission system of FIG. 7.

As illustrated in FIG. 9, the second rib portion 63b is formed in a position corresponding to the first connection hole 51a of the transfer input shaft 51 (i.e., so as to be inserted into the first connection hole 51a), when the rib member 63 is fixed to the transmission case 61.

With the rib member 63 configured in this manner, the lubricating oil received by the first rib portion 63a is guided to the semicylindrical second rib portion 63b, by a lower face of the first rib portion 63a, a face on the transfer input shaft 51 side of the first rib wall portion 63c, and a face opposite to the transfer input shaft 51 side of the second rib wall portion 63d. The lubricating oil thus guided is guided to the first connection hole 51a of the transfer input shaft 51, through the second rib portion 63b.

Meanwhile, the lubricating oil received by the second rib portion 63b is guided directly to the first connection hole 51a by the second rib portion 63b.

As in the case of the power transmission system of the first embodiment, the power transmission system of the embodiment configured in this manner does not require any lubrication mechanism for the transfer device 5, and does not require formation of a channel for lubricating oil in the transmission case 61 or the transfer case 53. Hence, enlargement of the system can be avoided. Additionally, a sufficient amount of lubricating oil can be stably supplied to the transfer device 5.

Third Embodiment

Hereinafter, a power transmission system of a third embodiment will be described with reference to FIGS. 10 to 12. Note, however, that the power transmission system of the embodiment differs from the power transmission system of the first embodiment and the power transmission system of the second embodiment only in the configuration of a rib and the configuration of an end face of a transfer input shaft. Accordingly, parts configured in the same manner as the power transmission system of the first embodiment or the power transmission system of the second embodiment are assigned the same reference numerals, and detailed descriptions thereof will be omitted.

Figure 10:
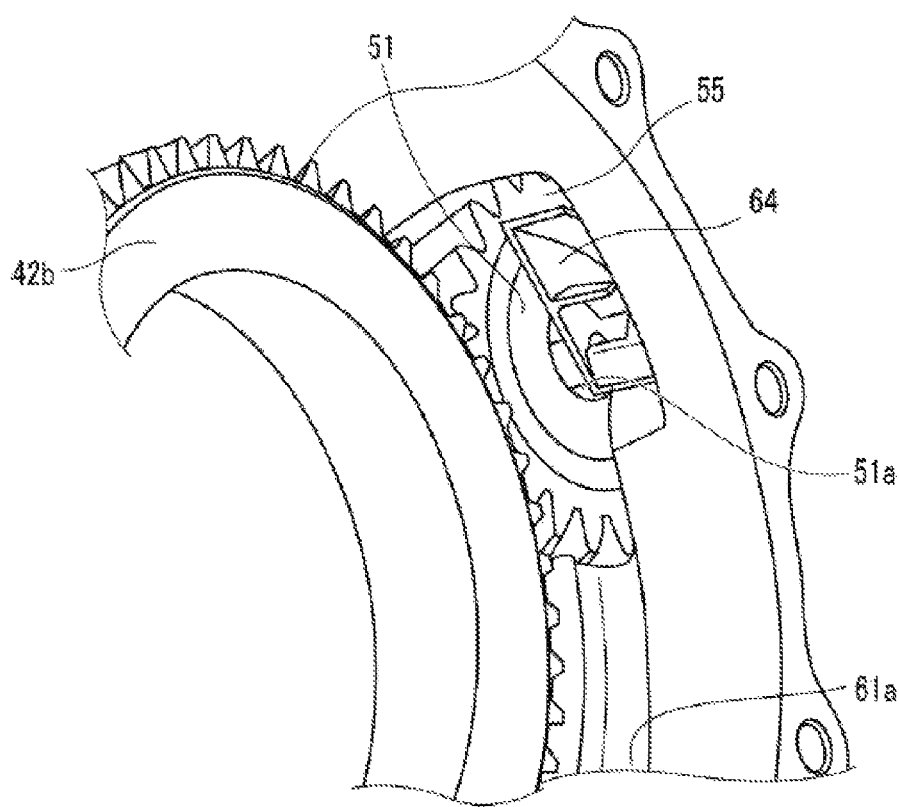
FIG. 10 is an enlarged perspective view of a main part of a power transmission system of a third embodiment.

As illustrated in FIG. 10, a rib of the embodiment is configured of a rib member 64 arranged inside a transmission case 61.

Figure 11:
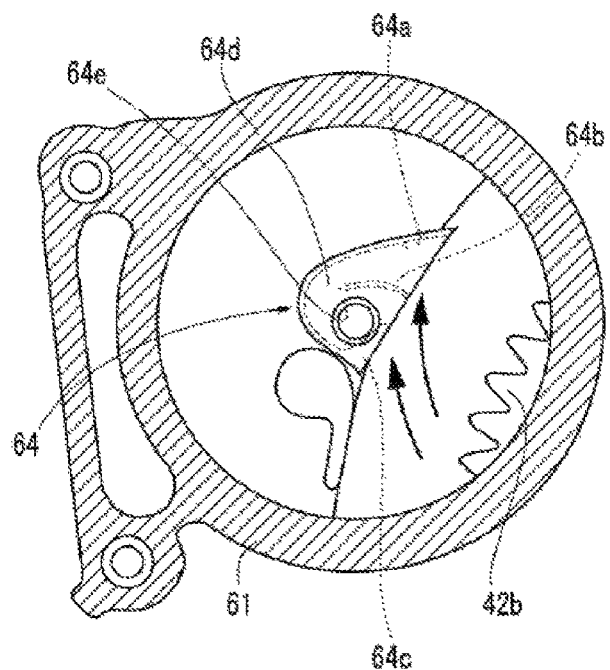
FIG. 11 is a plan view of an internal structure of a main part of a transmission case and a structure of a rib member of the power transmission system of FIG. 10.

As illustrated in FIG. 11, the rib member 64 includes a first rib portion 64a extending in the rotational axis direction of a transfer input shaft 51, a second rib portion 64b provided below the first rib portion 64a, and a third rib portion 64c provided lower than the second rib portion 64.

The rib member 64 also includes a rib wall portion 64d connected to end parts of the first rib portion 64a, the second rib portion 64b, and the third rib portion 64c on the transfer input shaft 51 side, and a rib cylinder portion 64e extending to the transfer input shaft 51 side from an opening of the rib wall portion 64d.

Note that in the rib member 64, the first rib portion 64a and the second rib portion 64b are end parts opposite to the transfer input shaft 51 side, and are not connected to each other. Also, in the rib member 64, the second rib portion 64b and the rib cylinder portion 64e are provided independently.

A tip end part of the first rib portion 64a protrudes further to a transfer drive gear 42b side than a tip end part of the second rib portion 64b.

Hence, when the rotation speed of the transfer drive gear 42b is high (i.e., when lubricating oil is scraped up higher as indicated by the right arrow in FIG. 11), the first rib portion 64a receives the lubricating oil. On the other hand, when the rotation speed is low (i.e., when lubricating oil is not scraped up so high, as indicated by the left arrow in FIG. 11), the second rib portion 64b receives the lubricating oil.

Figure 12:
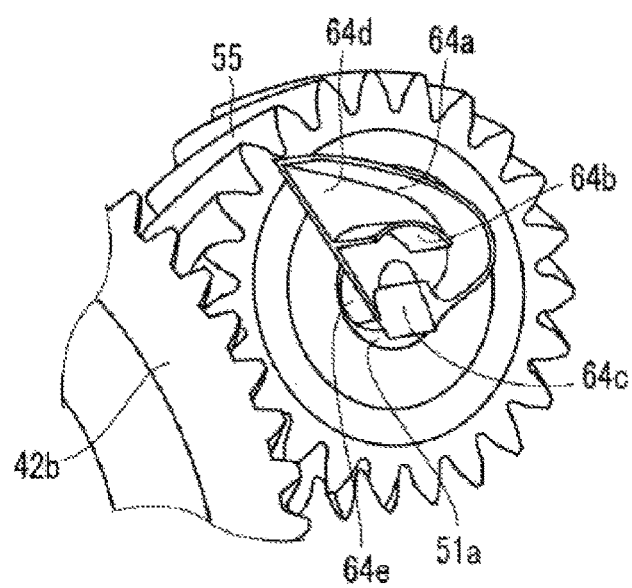
FIG. 12 is a perspective view of an end part of a transfer input shaft and the structure of the rib member of the power transmission system of FIG. 10.

As illustrated in FIG. 12, the rib portion 64e is formed in a position corresponding to the first connection hole 51a of the transfer input shaft 51 (i.e., so as to be inserted into the first connection hole 51a), when the rib member 64 is fixed to the transmission case 61.

With the rib member 64 configured in this manner, the lubricating oil received by the first rib portion 64a is guided to a vertically extending third rib portion 64c, by a lower face of the first rib portion 64a, an upper face of the second rib portion 64b, the rib wall portion 64d, and the transmission case 61. The lubricating oil thus guided is received by a third rib portion 64c, and then is guided to the first connection hole 51a, through the opening of the rib wall portion 64d and the rib cylinder portion 64e.

Meanwhile, the lubricating oil received by the second rib portion 64b trickles down the lower face of the second rib portion 64b, and is guided directly to the first connection hole 51a by the opening of the rib wall portion 64d and the rib cylinder portion 64e.

Note that since the rib of the embodiment is configured of the above rib member 64, the lubricating oil received by the rib member 64 is guided directly to the first connection hole 51a, and is not directed by the end face of the transfer input shaft 51 on the transfer input gear 55 side. For this reason, in the transfer input shaft 51 of the embodiment, the end face on the transfer input gear 55 side is formed into a flat shape without the radial groove portion or the like.

As in the case of the power transmission system of the first embodiment and the second embodiment, the power transmission system of the embodiment configured in this manner does not require any lubrication mechanism for the transfer device 5, and does not require formation of a channel for lubricating oil in the transmission case 61 or the transfer case 53. Hence, enlargement of the system can be avoided. Additionally, a sufficient amount of lubricating oil can be stably supplied to the transfer device 5.

The invention claimed is:

1. A power transmission system comprising:
a differential device;
a transfer device arranged adjacent to said differential device; and
a case housing therein said differential device and said transfer device and forming therein a fluid reservoir of lubricating fluid, wherein
said differential device comprises,
a rotation member rotatably supported by said case and configured to rotate by a driving force from a final drive gear driven by a power source while the lubricating fluid is scooped up from the fluid reservoir with the rotating rotation member,
said transfer device comprises,
a transfer input gear driven by a driving force transmitted from said rotation member, and
a transfer input shaft rotatably supported by said case and supports said transfer input gear at one end of said transfer input shaft such that said rotation member and said transfer input shaft rotate together,
said transfer input shaft has,
a connection hole that extends in a rotational axis direction of the transfer input shaft from the one end of the transfer input shaft on its transfer input gear side, penetrates an inside of said transfer input shaft and opens to an outside of said transfer input shaft, thereby connecting the transfer input gear side, the inside of said transfer input shaft and the outside thereof, the lubricating fluid flowing into the connection hole at the one end of said transfer input shaft, and
said case has,
a rib formed at a position facing the one end of said transfer input shaft on said transfer input gear side and configured to receive the flow of the lubricating fluid scooped up by said rotation member from said fluid reservoir and guide the flow of the lubricating fluid toward said connection hole.

2. The power transmission system according to claim 1, wherein
said fluid reservoir is formed in said case, and the case comprises a first case rotatably supporting said rotation member and a second case rotatably supporting said transfer input shaft, and
said connection hole connects the inside of said first case and the inside of said second case.

3. The power transmission system according to claim 1, wherein
said transfer input shaft has a radial groove formed at the one end of said transfer input shaft on said transfer input gear side, the radial groove extending radially outward from an edge of said connection hole and curving toward the rotational axis direction of said transfer input shaft such that a side edge of said radial groove on a rear side in the rotational axis direction of said transfer input shaft curves so as to protrude further to a front side in the rotation direction of said transfer input shaft, toward the radially outer side.

4. The power transmission system according to claim 1, wherein
the one end of said transfer input shaft has an annular groove extending along a circumferential part of the one end at said transfer gear side.

5. The power transmission system according to claim 1, wherein
said transfer input gear is supported at the one end of said transfer input shaft such that one side of the transfer input gear and the one end of said transfer input shaft coincide with each other.

6. The power transmission system according to claim 1, wherein
the one end of said transfer input shaft on said transfer input gear side comprises a surface inclined inward toward a center of the one end.

7. The power transmission system according to claim 1, wherein
said rib comprises a first rib part and a second rib part provided lower than said first rib, and a front end of said first rib part protrudes further to a side of said rotation member than a front end of said second rib part.

8. The power transmission system according to claim 1, wherein
said first case has a flow-guiding groove that extends along a circumferential surface of said rotation member below said rib, and
said rib is positioned on a line extended from said flow-guiding groove.

* * * * *